(12) United States Patent
Zweig et al.

(10) Patent No.: US 8,401,852 B2
(45) Date of Patent: Mar. 19, 2013

(54) UTILIZING FEATURES GENERATED FROM PHONIC UNITS IN SPEECH RECOGNITION

(75) Inventors: Geoffrey Gerson Zweig, Sammamish, WA (US); Patrick An-Phu Nguyen, Kirkland, WA (US); James Garnet Droppo, III, Carnation, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 12/626,943

(22) Filed: Nov. 30, 2009

(65) Prior Publication Data

US 2011/0131046 A1     Jun. 2, 2011

(51) Int. Cl.
*G10L 15/04* (2006.01)
(52) U.S. Cl. ...................................................... 704/251
(58) Field of Classification Search .................... 704/251
See application file for complete search history.

(56) References Cited

U.S. PATENT DOCUMENTS

| | | | | |
|---|---|---|---|---|
| 6,523,019 B1 * | 2/2003 | Borthwick | ...................... | 706/45 |
| 6,816,836 B2 * | 11/2004 | Basu et al. | ..................... | 704/270 |
| 7,016,833 B2 * | 3/2006 | Gable et al. | .................... | 704/209 |
| 7,216,077 B1 * | 5/2007 | Padmanabhan et al. | ...... | 704/240 |
| 7,464,031 B2 * | 12/2008 | Axelrod et al. | ............... | 704/236 |
| 7,646,916 B2 * | 1/2010 | O'Hara et al. | ................ | 382/190 |
| 7,869,657 B2 * | 1/2011 | Podilchuk | .................... | 382/218 |
| 2007/0067171 A1 | 3/2007 | Mahajan et al. | | |
| 2007/0129936 A1 | 6/2007 | Wang et al. | | |
| 2009/0204390 A1 | 8/2009 | Yamamoto et al. | | |
| 2009/0210230 A1 | 8/2009 | Schwarz | | |

OTHER PUBLICATIONS

Abdel-Haleem, Yasser Hifny, Conditional Random Fields for Continuous Speech Recognition, retrieved at <<http://publications.dcs.shef.ac.uk/files/abdel-haleem/2007/3947_Abdel-Haleem2007.pdf>>, Nov. 2006, pp. 1-165.

Jancsary, et al., "Revealing the Structure of Medical Dictations with Conditional Random Fields", retrieved at <<http://aclweb.org/anthology/D/D08/D08-1001.pdf>>, Proceedings of the 2008 Conference on Empirical Methods in Natural Language Processing, Oct. 2008, pp. 1-10.

Peng, et al., "Chinese Segmentation and New Word Detection using Conditional Random Fields", retrieved at <<http://acl.ldc.upenn.edu/coling2004/MAIN/pdf/81-833.pdf>>, 2004, pp. 1-7.

Morris, et al., "Combining Phonetic Attributes using Conditional Random Fields", retrieved at <<http://citeseerx.ist.psu.edu/viewdoc/download?doi=10.1.1.130.5663&rep=rep1&type=pdf>>, Sep. 17-21, 2006, INTERSPEECH, pp. 597-600.

Liu, et al., "Enriching Speech Recognition with Automatic Detection of Sentence Boundaries and Disfluencies", retrieved at <<http://www.terpconnect.umd.edu/~mharper/papers/enrichspeech.pdf>>, IEEE Transactions on Speech & Audio Processing, Sep. 2006, pp. 1-15.

* cited by examiner

*Primary Examiner* — Susan McFadden

(57) ABSTRACT

A computer-implemented speech recognition system described herein includes a receiver component that receives a plurality of detected units of an audio signal, wherein the audio signal comprises a speech utterance of an individual. A selector component selects a subset of the plurality of detected units that correspond to a particular time-span. A generator component generates at least one feature with respect to the particular time-span, wherein the at least one feature is one of an existence feature, an expectation feature, or an edit distance feature. Additionally, a statistical speech recognition model outputs at least one word that corresponds to the particular time-span based at least in part upon the at least one feature generated by the feature generator component.

20 Claims, 8 Drawing Sheets

UTILIZING FEATURES GENERATED FROM PHONIC UNITS IN SPEECH RECOGNITION

BACKGROUND

Speech recognition systems are utilized in many computer-based applications. For example, some mobile telephones are equipped with speech recognition systems that allow users of the mobile telephones to speak a name of a contact to be dialed, and the speech recognition system can recognize the spoken name from amongst a list of contacts of the user retained in the mobile telephone. The mobile telephone may then automatically dial the telephone number of the contact whose name was uttered by the user of the mobile telephone. In another example, some customer service applications accessible by way of a telephone can utilize speech recognition systems. For instance, the customer service application may be automated and may provide a user with several options. The user may then verbally utter a desired option, and the speech recognition system can recognize the selection of the user.

Various approaches have been undertaken in connection with performing speech recognition. For instance, generative models have been utilized in connection with performing speech recognition. In a generative model, first, information is known a priori on words or sequences of words that people are likely to speak (p(w)). For observations, the probability of such observations, given a certain word, can be modeled. A probability of the word (the prior) and the probability of the observations given the word can be utilized to determine a probability that the observations correspond to the word. Specifically, a word sequence that optimizes the combination of the probability of the word and the probability of certain observations given the word can be ascertained.

In another approach, direct modeling can be utilized in a speech recognition system. In the direct modeling approach, a model is utilized to model a probability of a word sequence given one or more observations without requiring the two separate computations described above pertaining to the generative model approach (the prior probability of word sequences and the probability of some observations given word sequences). Generative models can always output scores which can be used as features within the direct modeling framework.

SUMMARY

The following is a brief summary of subject matter that is described in greater detail herein. This summary is not intended to be limiting as to the scope of the claims.

Described herein are various technologies pertaining to speech recognition in general, and more particularly the use of one or more of an existence feature, an expectation feature, or an edit distance feature in connection with performing speech recognition on an utterance. An utterance of an individual may include a word or sequence of words, and such utterance can be captured by a microphone or other suitable device. A detector can be employed to detect units of the audio signal captured by the microphone. For instance, a unit may be a phone, which is a rudimentary sound utilized in speech. In another example, a unit detectable by the detector can be a sequence of phones, syllables, a shape of the mouth when saying a word or phrase, etc. Thus, for an audio signal that comprises an utterance, the detector can output a stream of detected units, wherein each detected unit may have a time stamp corresponding thereto that can be utilized to indicate a position of the detected unit in the stream relative to other units in the stream. Units may be detected with a certain amount of confidence.

Once the stream of detected units has been generated, features can be generated that are based at least in part upon the detected units for a certain time span. The features generated/extracted can be one or more of an existence feature, an expectation feature, or an edit distance feature. An existence feature can indicate, for a certain hypothesized word, whether or not a particular unit has been detected in the time span of interest in the stream of detected units. For instance, an existence feature can be of the form, "the word is X, and the unit Y occurs." An existence feature may exist for each possible word/unit pair.

Expectation features are similar to existence features, but exist only when extra knowledge is present, e.g. in the form of a pronunciation dictionary. Specifically, an expectation feature can indicate whether or not a detected unit is consistent with expected units of a hypothesized word, wherein the expected units can be ascertained from a pronunciation dictionary. For instance, a unit can be a phone, and a dictionary may include phones that make up pronunciation of a particular word. Therefore, for a hypothesized word, an expectation feature can indicate whether or not a unit is correctly detected, whether a unit is falsely detected, whether the unit is not detected but should be detected, or whether the unit is not detected and should not be detected.

An edit distance feature can be indicative of a consistency between a hypothesized word and a plurality of units in the detected stream of units in the time span of interest. Edit distance features are similar to expectation features, but in addition incorporate ordering information. The edit distance features can be context dependent in nature or context independent in nature. For context independent edit distance features, a number of edits needed to alter an expected pronunciation into the sequence of units seen in the detector stream can be ascertained. Thus, several features can exist for each unit, wherein the features can indicate whether a unit in the detected stream correctly matches a unit in the expected pronunciation, whether a unit needs to be deleted from units in the expected pronunciation to match units in the detected stream of units, whether a unit needs to be inserted into units in the expected pronunciation to match the units in the detected stream of units, or whether units need to be replaced in units in the expected pronunciation to match the units in the expected stream of units. Context dependent edit distance features can be scores that are indicative of a consistency between a pronounced series of units versus a detected series of units. Thus context-sensitive edit distance features can take into consideration patterns of differences between units in an expected pronunciation and detected units.

These features can be weighted based at least in part upon learned correlations between the features and recognized words or phrases. For instance, a feature that indicates that a unit in the detected stream of units is consistent with a unit in an expected pronunciation of a word or sequence of words can have a positive weight, while features that indicate inconsistency between units in the detected stream of units and units of an expected pronunciation of a word can be assigned a negative weight. The weighted features can be utilized by a statistical speech recognition model to determine a word spoken in the utterance of the individual. The statistical model can be or include a direct model or a generative model. In a specific example, the statistical model may utilize detector-based segmental conditional random fields.

Other aspects will be appreciated upon reading and understanding the attached figures and description.

DETAILED DESCRIPTION

Figure 1:
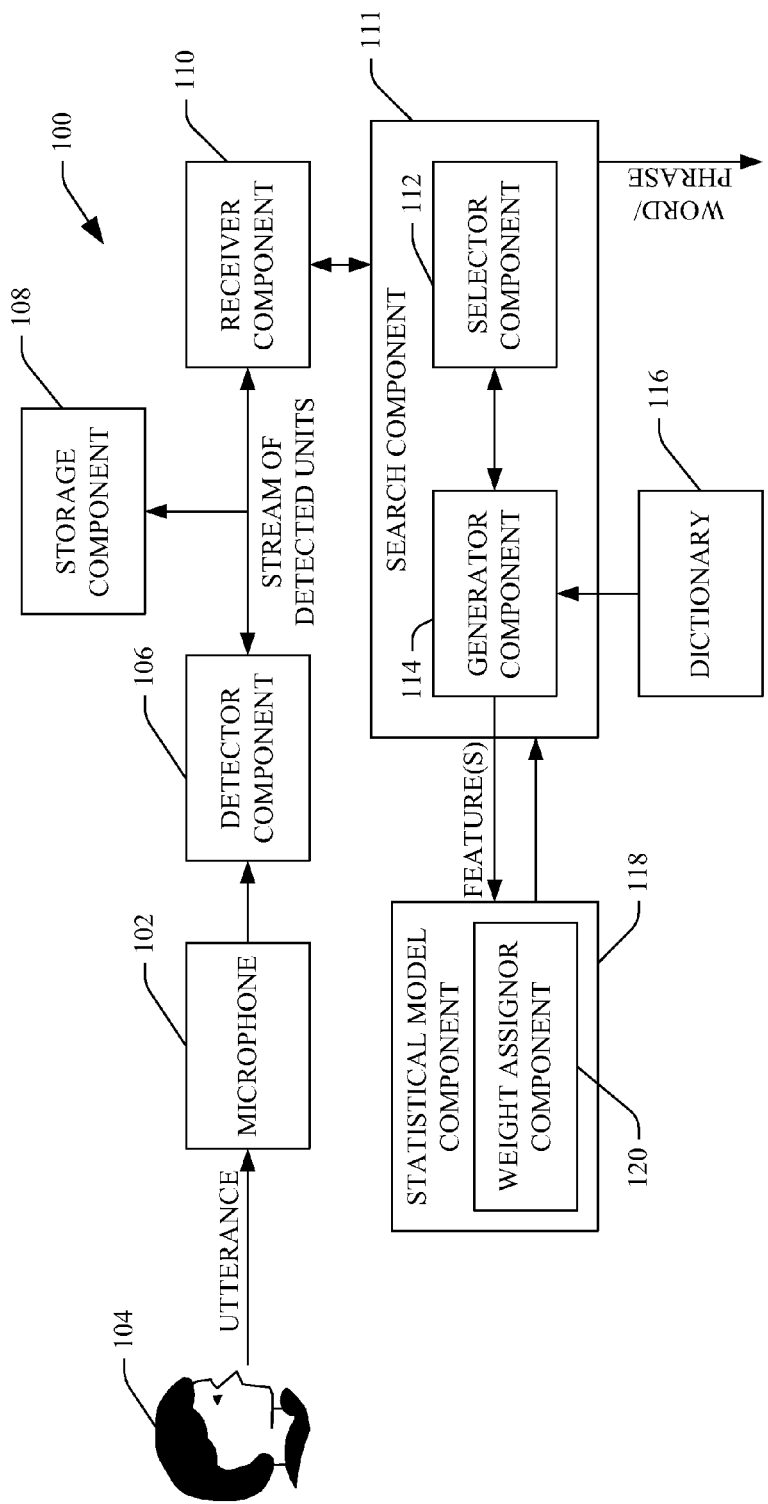
FIG. 1 is a functional block diagram of an example system that facilitates generating features for utilization in a speech recognition system.

Various technologies pertaining to speech recognition will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates utilizing/generating features from a detected stream of phonetic units is illustrated. The system 100 comprises a microphone 102 that is configured to receive a speech utterance of an individual 104. The microphone 102 may be included in a portable computing device, for instance, such as a mobile telephone. In another example, the microphone 102 may be in a land line telephone, in a stand-alone computing device, etc. While not shown, the microphone 102 may be in operative connection with a memory such that the utterance emitted by the individual 104 can be stored in such memory. A detector component 106 can have access to the utterance output by the individual 104, and can detect units included in the utterance. For instance, the detector component 106 can be configured to detect phones in the speech utterance, wherein a phone is a fundamental phonetic portion of speech. In another example, the detector component 106 can be configured to detect syllables in the speech utterance. In still yet another example, the detector component 106 can be configured to detect a sequence of phones in the speech utterance. For instance, phones for the word "Texas" include "t", "eh", "k", "s", "ax" and "s". In another example, the detector component 106 can be configured to detect that energy in a first portion of the utterance is greater than energy in the second portion of the utterance. Still further, the detector component 106 can be configured to detect articulatory actions, such as when a tongue of individual 104 touches the palate of the individual 104, when the tongue of the individual is touching her teeth, when lips of the individual are round when speaking or not rounded, amongst other articulatory detections. Thus, for instance, the detector component 106 can detect any of the above units, including but not limited to phones, phone classes, sequences of phones, syllables, words, or a combination thereof. The detector component 106 can assign a time stamp to each unit detected such that the detector component 106 can output a stream of detected units. The detector component 106 can be one form of an input sensor that can detect portions of an utterance. It is to be understood, however, that other input sensors are contemplated and are intended to fall under the scope of the hereto-appended claims.

Still further, the detector component 106 can output a confidence score pertaining to a detected unit. This confidence score can indicate a probability of existence of the unit. In an example, each detected unit may be assigned a probability (confidence score).

Additionally, while the detector component 106 is described as detecting units in a spoken utterance, it is to be understood that an input sensor may be configured to detect non-audible cues, such as sign language gestures or computer-input (via a mouse, touch-sensitive display, static pad, etc). Thus, the detector component 106 can detect a certain hand position, for example.

A storage component 108 can be in operative connection with the detector component 106, and can receive/store the stream of detected units output by the detector component 106. The storage component 108 may be the memory discussed earlier or some other suitable computer readable medium.

The system 100 can additionally comprise a receiver component 110 that has access to the storage component 108 and can receive the stream of detected units generated by the detector component 106. A search component 111 can perform a search over various segmentations of training data (not shown). The search component 111 comprises a selector component 112 that can select a subset of units in the stream of detected units that correspond to a certain time span based at least in part upon the search performed by the search component 111. For instance, the selector component 112 can search for pauses in the speech utterance output by the individual 104 and can select units in the stream of detected units that are between times corresponding to the pauses in the speech of the individual 104. Thus, for example, the selector component 112 can select units in the stream of detected units that correspond to a word in the speech of the individual 104 or a sequence of words in the speech of the individual 104.

The search component 111 may further comprise a generator component 114 that can receive the units in the stream of units selected by the selector component 112 and can generate at least one feature with respect to the selected units (e.g., in the time span corresponding to the selected units). The at least one feature generated by the generator component 114 can be one or more of: an existence feature, an expectation feature, or an edit distance feature. Generally, an existence feature can be indicative of whether or not a particular unit is detected in the time span of interest.

An expectation feature can be indicative of whether or not a detected unit in the time span of interest is consistent with units of a hypothesized word. For example, the generator component 114 can have access to a dictionary 116 that comprises words and units that make up such words. Therefore, for instance, if the detected units are phones, the dictionary 116 may include words and phones that describe pronunciation of such word. Thus, when generating an expectation feature, the generator component 114 can access the dictionary 116 and select a hypothesized word, and then may compare expected units in the hypothesized word (as ascertained from the dictionary) against units in the detected stream of units.

An edit distance feature can be indicative of a consistency between a hypothesized word in the dictionary 116 and the plurality of units in the detected units. As will be described in greater detail below, an edit distance feature can be context-independent or context-dependent. Existence features, expectation features, and edit distance features will be described in greater detail below.

While these features are described as being generated directly from unit sensors, it is to be understood that the features can be derived from a generative model or combination of generative models used in a speech recognition system. For instance, baseline Hidden Markov features and scores and language model scores can be generated, and the existence features, expectation features, and edit distance features can be derived from such baseline features.

The features can be received by a statistical model 118 that comprises a weight assignor component 120. The weight assignor component 120 can receive the features output by the generator component 114 and can learn weights for each of the features. These learned weights may be assigned to the features. For example, the weight assignor component 120 can assign positive weights to features that indicate consistency between a hypothesized word and the units in the stream of detected units, and the weight assignor component 120 can assign a negative weight to features that indicate an inconsistency between the hypothesized word and units in the stream of detected units.

The statistical model component 118 can output a score or scores based at least in part upon weights assigned by the weight assignor component 120 with respect to a segmentation selected by the search component 111. The statistical model component 118 can be or include a direct speech recognition model or a generative speech recognition model and utilize such model in connection with generating/output the aforementioned score or scores. In a particular example, a segmental conditional random field model can be included in the statistical model component 118. It is to be understood, however, that the statistical model component 118 may be or include any suitable speech recognition model/technique. The scores for a plurality of different segmentations can be received by the search component 111, which can select a substantially optimal segment or set of segments based at least in part upon the scores. The search component 111 may then output a word or phrase based at least in part upon the substantially optimal segment and scores assigned thereto. For instance, the search component 111 can ascertain with a particular probability that a certain word corresponds to contents of the utterance of the individual 104.

The system 100 may be employed in a variety of applications. For instance, the system 100 may be utilized in a directory lookup application where the individual 104 issues a request for information such as a phone number and address, etc., and the system 100 is employed to recognize the request. Furthermore, the system 100 may be included in any suitable computer device, such as incorporated into a mobile phone or a phone conference system.

Figures 2, 3:
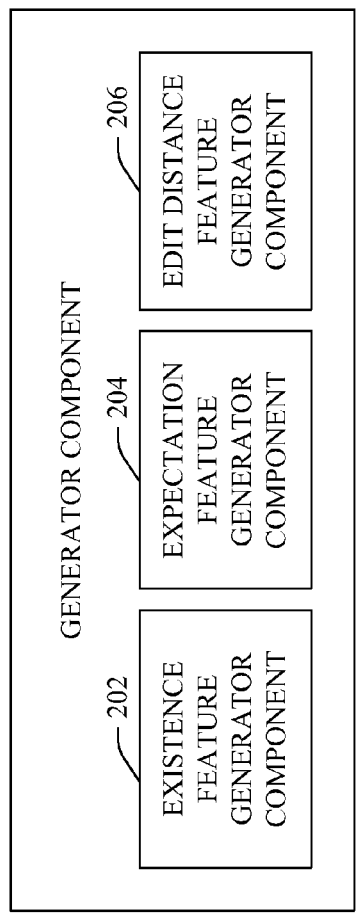
FIG. 2 is a functional block diagram of an example component that generates features based at least in part upon detected units of speech.
FIG. 3 is a graphical representation of a conditional random field.

With reference now to FIG. 2, an example depiction of the generator component 114 that generates existence features, expectation features, and/or edit distance features, is illustrated. The generator component 114 comprises an existence feature generator component 202 that generates existence features, an expectation feature generator component 204 that generates expectation features, and an edit distance feature generator component 206 that generates edit distance features.

With more detail pertaining to the existence feature generator component 202, such component 202 can be configured to generate existence features upon receiving a stream of detected units. For example, the detected units may be phones, multi-phones, syllables, or other suitable units. The existence feature generator component 202 generates an existence feature that indicates whether a detected unit exists within a span of units of a certain word. Thus, existence features can be generally of the form, "The word is X and the unit Y occurs." In an example, the detector component 106 (FIG. 1) can analyze the audio signal and detect the following sequence: "t", "eh", "k", "ax", "n", wherein the detector component 106 is configured to detect phones. The generator component 114 can hypothesize that the word "Texas" pertains to the observed sequence of units. In this example, the existence feature generator component 202 can generate the feature, "The word is 'Texas' and 't' has been detected" as being true, and can generate the feature, "The word is "Texas" and 's' has been detected" as false. Pursuant to an example, the existence feature generator component 202 can generate existence features for each word/unit pair. Therefore, if the existence feature generator component 202 forms an exhaustive feature generation, the number of existence features generated can be a number of possible units multiplied by the number of words in the dictionary 116. Alternatively, the number of existence features generated by the existence feature generator component 202 can be constrained.

The expectation feature generator component 204, as indicated above, can generate expectation features for a particular time span of the stream of detected units, wherein an expectation feature generally indicates whether or not a detected unit is consistent with expected units of a hypothesized word (as obtained from the dictionary 116). The expectation feature generator component 204 can generate expectation features in four forms: 1) an indication that a detected unit in the stream of detected units is expected to be detected for the hypothesized word; 2) an indication that a detected unit in the stream of detected units is not expected to be detected for the hypothesized word; 3) an indication that a unit in the hypothesized word is not included in the stream of detected units; or 4) an indication that a unit not existent in the hypothesized word is not included in the stream of detected units. These can be referred to as "correct accept," "false accept," "false reject," and "correct reject," respectively. In an example, the hypothesized word can be "Texas" and the stream of detected units may be phones "t", "eh", "k", "ax", "n". The phones in the dictionary 116 for the word Texas may be "t", "eh", "k", "s", "ax", "s". Therefore, the expectation feature generator component 204 can generate a correct accept feature for the unit "t", since the unit is expected to be included in the pronunciation of "Texas" (from the dictionary 116) and is correctly detected by the detector. In another example, the expectation feature generator component 204 can generate a false accept for the unit "n", since Texas in the dictionary 116 does not include the phone "n" but the stream of detected units includes the phone "n". An example false reject in the Texas example is that the phone "s" is expected to be included in the pronunciation of the word Texas, but is not included in the stream of detected units. An example correct reject is that the phone "p" is not expected to be included in the word Texas, and is not included in the stream of detected units. It is to be understood that correct rejects are optional, and may not be generated by the expectation feature generator component 204.

The edit distance feature generator component 206 can receive the stream of detected units and can generate one or more features that are indicative of a consistency between a hypothesized word and detected units in the stream of detected units. Specifically, the edit distance feature generator component 206 can generate two different types of edit distance features: 1) context-independent edit distance feature; and 2) context-dependent edit distance features.

Referring briefly to FIG. 3, an example alignment 300 of detected phones versus expected phones are illustrated to aid in explanation of context-independent edit distance features. Context-independent edit distance features can measure a number of edits needed to cause a dictionary pronunciation of a hypothetical word to match the sequence of units in the stream of detected units. For example, several types of context-independent features can exist for each unit in the hypothesized units from the dictionary 116: 1) match; 2) insert; 3) delete; and 4) substitute. A match feature indicates that a unit in the dictionary pronunciation need not be altered, as it matches a detected unit in the detector stream. An insert unit indicates that a unit must be added to the pronunciation of the hypothetical word to cause such pronunciation to match the sequence of detected units. A delete feature indicates that a unit from the dictionary pronunciation of the hypothetical word must be deleted to cause such pronunciation to match the units in the stream of detected units, and a substitute feature indicates that a unit in the hypothetical pronunciation needs to be switched with another unit to match the units in the stream of detected units. In the example above, and as shown in FIG. 3, a dictionary pronunciation 302 of the word "Texas" is produced via the following phones: "t", "eh", "k", "s", "ax", "s". Furthermore, a stream of detected units 304 includes the units "t", "k", "s", "ax", "n", and "k". The sequence of phones 302 from the dictionary and the sequence of detected units 304 are aligned for purposes of illustration. As can be ascertained, the following context-independent features can be extracted: a match feature for "t", a delete feature for "eh", a match feature for "k", a match feature for the first "s", a match feature for "ax", a substitute feature for second "s", and an insert feature for "n".

Context-dependent edit distance features are indicative of a fit between a sequence of detected units and an expected set of units ascertained from a dictionary. To contract context-dependent features from context-independent features, context-independent features pertain to one edit at a time with respect to units in a hypothesized word. Context-dependent features pertain to patterns of words (e.g., a first unit has been deleted, followed by a second unit being inserted). Example context-dependent edit distance features that can be extracted from the alignment 300 are as follows: a match "t" followed by a delete "eh"; a delete "eh" followed by a match "k", a match "k" followed by a match "s", etc.

Returning to FIG. 2, and with more specificity pertaining to context-dependent edit distance features, a word string w is likely to be correct when its associated pronunciation stream p is identical to the stream found by a phonetic detector, for instance. Conversely, if the two phone streams are quite different, then the word string w is probably not correct. Therefore a context-dependent edit feature can indicate that a word string closely corresponds to a pronunciation stream or does not closely correspond to a pronunciation stream. While the context-dependent features are useful in speech recognition, they do not take into consideration errors that are relatively common and benign, or that certain errors should be more highly penalized. Since differences between a pronunciation of a word in a dictionary and an actual pronunciation of a word may be caused by acoustic confusability, accented speech, noise, or unexpected pronunciations, such patterns can be systematic and learnable. Thus, the context-dependent edit distance can be defined, from a hypothesized stream of units to an observed stream of units, as the conditional probability of the edits required to produce the observed stream of units from the hypothesized stream of units, after allowing the two streams to minimize a Levenshtein distance. Thus, if $P_x$ is considered to be the observed unit stream $P_{obs}$, and the current hypothesis is labeled as $P_{hyp}$, then the full conditional probability can be defined as $p(P_{obs}|P_{hyp})=p(o_1, o_2, \ldots, o_N|h_1, h_2, \ldots, h_N)$. Unfortunately, this complete model may have too many parameters to train. Thus, the model can be restricted to consider less context on both the observed unit stream and the hypothesized unit stream up to order j:

$$p(P_{obs}|P_{hyp}) \approx \prod_{t=1}^{N} p(o_t|o_{t-1}, \ldots ; o_{t-j}, h_t, \ldots, h_{t-j}) \qquad (1)$$

This model can be trained using two parallel sets of unit streams generated from training data (e.g., phonetic streams). For each utterance, the hypothesis unit stream can be generated by forced alignment of the reference word stream, using a standard pronunciation model. The observed unit stream can be generated by running a unit detector on each utterance. After aligning $P_{hyp}$ and $P_{obs}$, a table can be accumulated that contains the necessary counts. This table may then be used to estimate maximum likelihood parameters for the model. For example, to compute the likelihood of recognizing A after B when the reference contains symbols C and D, $$p(A|B;C,D) = \frac{\#(A,B;C,D)}{\sum_i \#(I,B;C,D)},$$

where #(A, B; C, D) is a number of times in the training data that symbols A and B occur in order aligned with the symbols C and D. The sum over i is meant to compute how many times the same pattern occurs with any symbol in place of A. To evaluate this model, $P_{obs}$ can be aligned with the various $P_{hyp}$ being considered, and a score can be assigned to each $P_{hyp}$ according to Equation 1.

Figure 4:
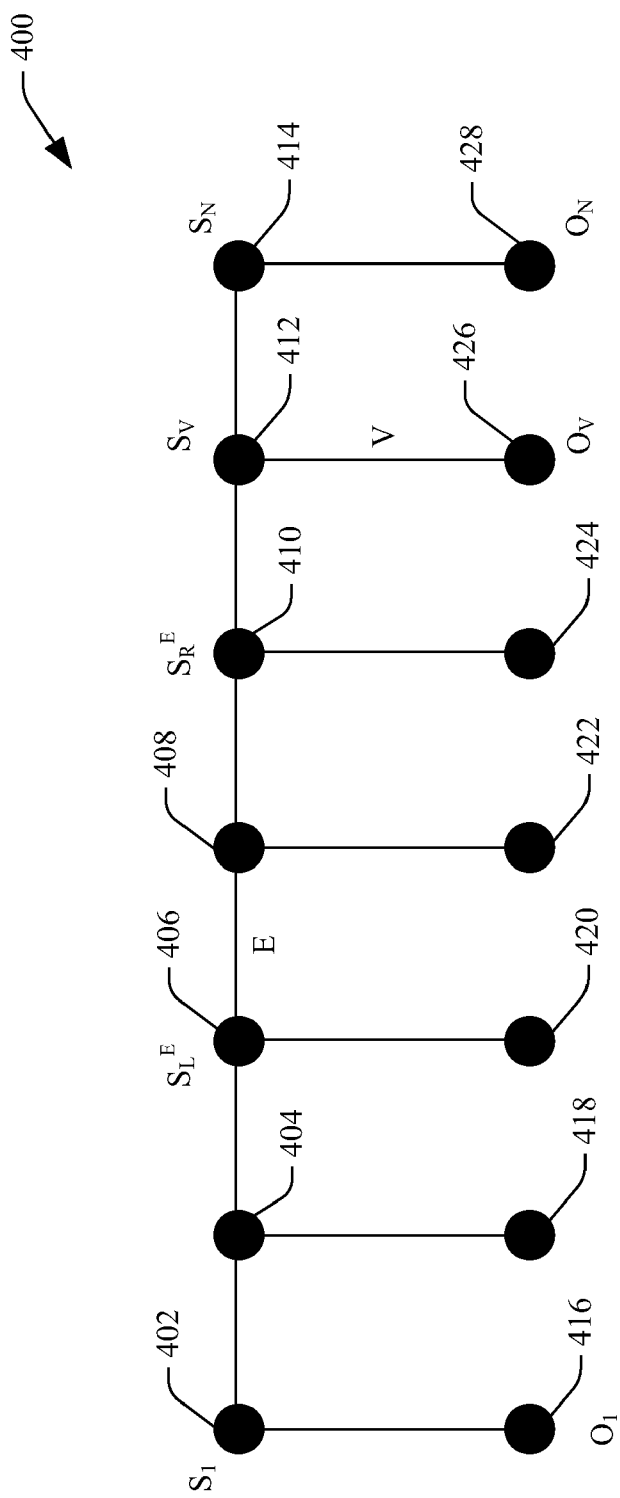
FIG. 4 is a graphical representation of a segmental conditional random field broken into two different segmentations.

Referring now to FIG. 4, an example segmental conditional random field 400 is illustrated. Segmental conditional random fields are also sometimes known as semi-Markov random fields or SCRFS. Specifically, FIG. 4 illustrates a standard conditional random field model. The model 400 includes a plurality of states 402-414 and a plurality of observations 416-428 that correspond to the plurality of states 402-414, respectively. The model 400 includes vertical edges between states and observations, wherein the vertical edges can be labeled v. Associated with each vertical edge v are one or more feature functions $f_k(s_v, o_v)$ relating the state variable to the associated observation. Horizontal edges e relate states to one another. Associated with each horizontal edge e are one or more feature functions $g_d(s_l^e, s_r^e)$ defined on adjacent left and right states. $s_l^e$ and $s_r^e$ can be used to denote the left and right states associated with an edge e. The set of functions (indexed by k and d) may be fixed across segments. A set of trainable parameters, $\lambda_k$ and $\rho_d$, can also be present in the model. The conditional probability of the state sequence s, given the observations o, may be given by the following:

$$P(s|o) = \frac{\exp\left(\sum_{v,k} \lambda_k f_k(s_v, o_v) + \sum_{e,d} \rho_d g_d(s_l^e, s_r^e)\right)}{\sum_{s'} \exp(\sum_{v,k} \lambda_k f_k(s'_v, o_v) + \sum_{e,d} \rho_d g_d(s'^e_l, s'^e_r))}$$

In speech recognition applications, the labels of interest (words) span multiple observation vectors, and the exact labeling of each observation may be unknown. Hidden conditional random fields can address this issue by summing over all labelings consistent with a known or hypothesized word sequence. However in some instances, the Markov property may be applied at the individual state level, with the result that segmental properties are not modeled. Further, there can be an inherent mismatch between the scale of the labels of interest (words) and the scale of observations (e.g., 100 per second in the case of phones). Thus, it may be desirable to make a direct association between a word level state variable and a word scale span of observations (units).

This can be undertaken via adopting formalism of segmental CRFs. In contrast to a CRF, the structure of the model is not fixed a priori. Instead, within N observations, all possible state chains of length 1≦N are considered, with the observations segmented into l chunks in multiple ways.

Figure 5:
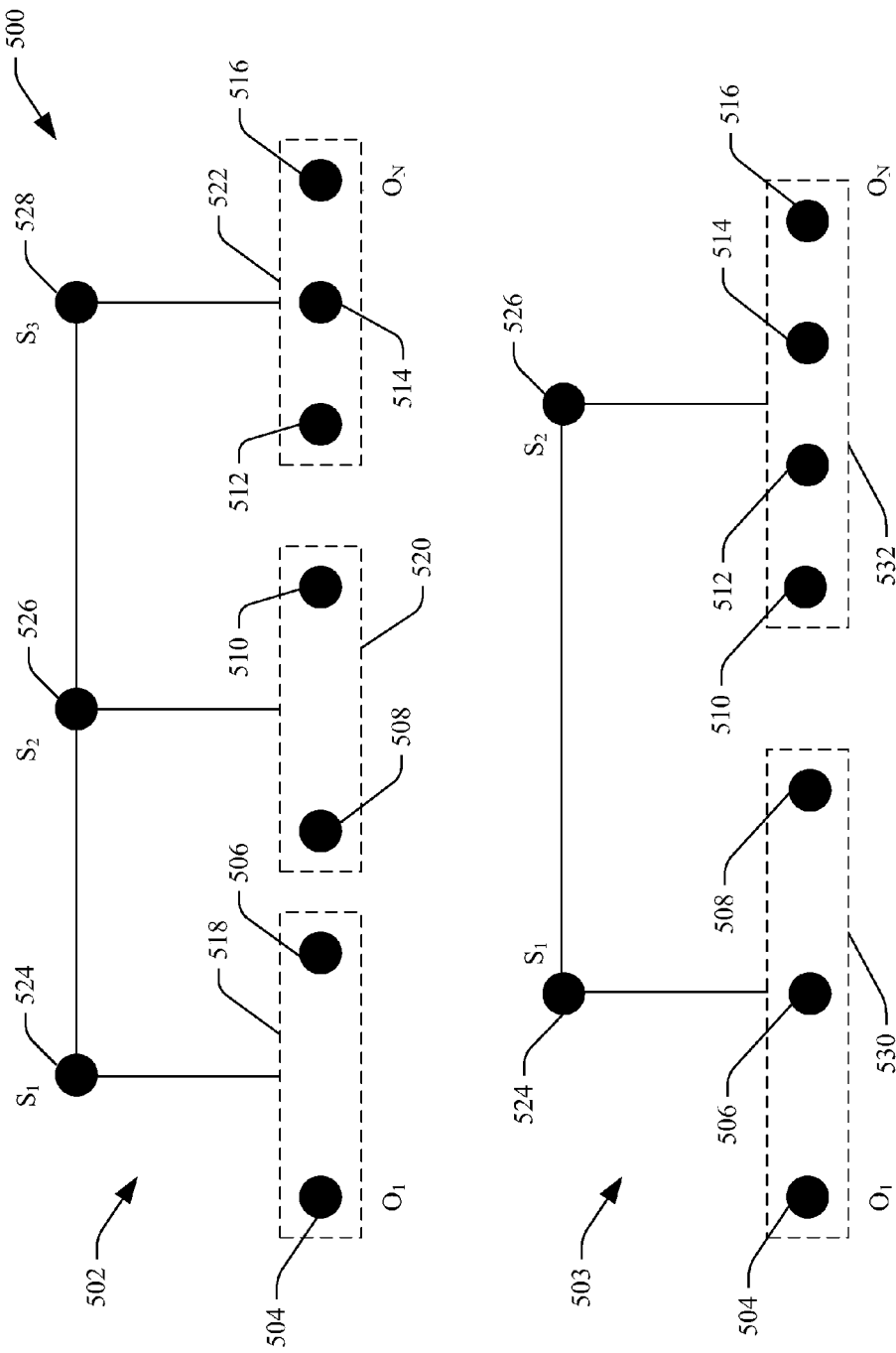
FIG. 5 illustrates a segmental conditional random field that takes into consideration last state information.

Referring to FIG. 5, a segmental conditional random field 500 and two different segmentations thereof 502 and 503 are illustrated. The first segmentation 502 includes seven observations 504-516 broken into three different segments 518-522. The segments 518-522 correspond to three states 524-528.

The second segmentation 503 depicts the observations 504-516, partitioned into two segments 530 and 532 that correspond to the states 524 and 526. For a given segmentation, feature functions can be defined in a manner substantially similar to how they are defined with standard CRFs. Because of the segmental nature of the model, transitions may occur at logical points, and it may be clear what span of observations to use to model a particular symbol.

Figure 6:
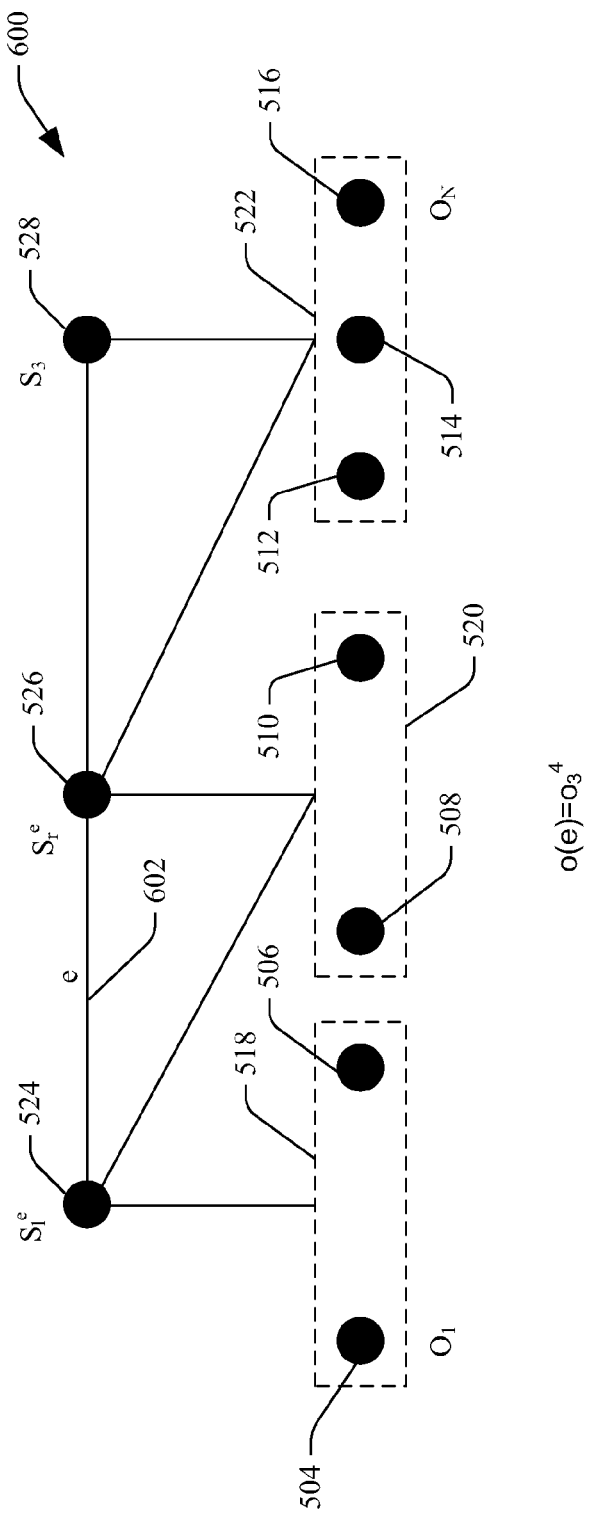
FIG. 6 is a flow diagram that illustrates an example methodology for using one or more of an existence feature, an expectation feature, or an edit distance feature to recognize at least one word in an utterance.

Referring now to FIG. 6, a segmental CRF 600 that incorporates last state information is illustrated. Since the g functions already involve pairs of states, it is no more computationally expensive to expand the f function to include pairs of states as well, as shown in FIG. 6. The structure of the segmental CRF 600 has a further benefit of allowing the dropping of distinctions between g and f functions. To denote a block of original observations, the terminology $o_i^j$ can be used to refer to observations i through j, inclusive. With respect to speech recognition applications, the segmentation of training data may not be known. Therefore, in computing sequence likelihood, substantially all segmentations consistent with the state (word) sequences s may be considered (e.g., for which the number of segments equals the length of the state sequence).

Specifically, a segmentation of observation sequences can be denoted by q. For example, the CRF of FIG. 3 has q equaling 3. The segmentation induces a set of horizontal edges between the states, referred to below as e∈q. One such edge 602 is labeled as e in FIG. 6. Further, for any given edge e, o(e) can be the segment associated with the right-hand state $s_r^e$ as shown in FIG. 6. The segment o(e) can span a block of observations from some start time to some end time $o_{st}^{et}$; as shown, o(e) is substantially similar to the block $o_3^4$. With such notation, all functions can be represented as $f_k(s_l^e, s_r^e, o(e))$, where o(e) are the observations associated with the segment of the right-hand state of the edge. The conditional probability of a state (word) sequence s, given an observation sequence o for an SCRF may then be given by the following:

$$p(s \mid o) = \frac{\sum_{q\ s.t.\ |q|=|s|} T_k(q)\exp\left(\sum_{e\in q,k} \lambda_k f_k(s_l^e, s_r^e, o(e))\right)}{\sum_{s'} \sum_{q\ s.t.\ |q|=|s'|} T_k(q)\exp\left(\sum_{e\in q,k} \lambda_k f_k(s_l'^e, s_r'^e, o(e))\right)}.$$

Training can be undertaken by gradient descent. Using the derivative of $\mathcal{L}=\log P(s|o)$ with respect to $\lambda_k$, the following gradient can be obtained:

$$\frac{\partial \mathcal{L}}{\partial \lambda_k} = \frac{\sum_{q\ s.t.\ |q|=|s|} T_k(q)\exp\left(\sum_{e\in q,k} \lambda_k f_k(s_l^e, s_r^e, o(e))\right)}{\sum_{q\ s.t.\ |q|=|s|} \exp(\sum_{e\in q,k} \lambda_k f_k(s_l^e, s_r^e, o(e)))} - \frac{\sum_{s'} \sum_{q\ s.t.\ |q|=|s'|} T_k(q)\exp\left(\sum_{e\in q,k} \lambda_k f_k(s_l'^e, s_r'^e, o(e))\right)}{\sum_{s'} \sum_{q\ s.t.\ |q|=|s'|} \exp(\sum_{e\in q,k} \lambda_k f_k(s_l'^e, s_r'^e, o(e)))},$$

where $T_k(q)=\Sigma_{e\in q}f_k(s_l^e,s_r^e,o(e))$ and $T'_k(q)=\Sigma_{e\in q}f_k(s_l'^e,s_r'^e,o(e))$. This derivative can be computed with dynamic programming in a first-pass state space reduction, using the recursions described in "A Segmental CRF Approach to Large Vocabulary Continuous Speech Recognition," by Geoffrey Zweig and Patrick Nguyen in *Proceedings of ASRU* 2009, the entirety of which is incorporated herein by reference. In an example, L1 and L2 regularization terms can be added to $\mathcal{L}$ to obtain a regularized objective function.

Specific to the speech recognition task, state transition functions with reference to a finite state representation of an ARPA language model can be utilized. For instance, the states in the SCRF can correspond to language model states rather than words per se, with word identities being implicit in the language model state. There may be a state for each 0 ... n−1 gram word sequence in the language model. Thus, from a hypothetical state corresponding to "the dog", a transition to "dog barked" can be present in a trigram language model containing the trigram "the dog barked". A transition to the lower order state "dog" may also be present to allow for bigram sequences such as "dog nipped" that may not be present as suffixes of trigrams. Any suitable word sequence may be possible due to the presence of backup arts, ultimately to the null history state. This may not imply an exponential number of language model states. The number of language model states can be limited to those seen in the training data, and in general count cutoffs can limit the number further.

Two example types of language model features that can be utilized are described herein. The first uses just one language model feature function, which can return the appropriate transition probability from the following language model:

$$f_{LM}^e(s_l^e, s_r^e, \cdot) = LM(s_l^e, s_r^e)$$

It can be ascertained that this is not restricted to a bigram language model. For example, the language model state might refer to a five-gram history and a six-gram model.

In the second approach, the acoustic and language models can be jointly and discriminately trained. This can be done by introducing a binary feature for each arc in a finite state representation of the language model. This feature is one if the arc is traversed in transitioning from language model state to another on a hypothesized word. It can be noted that this may involve traversing back-off arcs as well as word label arcs.

In a segmental framework, it is theoretically necessary to consider the possible existence of a segment between any pair of observations. The run time is quadratic, and the number of observations linear in the vocabulary and linear in the number of language states. Thus the computation may be excessive unless constrained in some manner. Such constraint may be implemented in any suitable manner. For instance, a function can be utilized which returns a set of words likely to begin at event t. Such words can be returned along with hypothesized end times.

As indicated above, performing computation with SCRF models including forward-backward recursions and gradient computation is described in "A Segmental CRF Approach to Large Vocabulary Continuous Speech Recognition," by Geoffrey Zweig and Patrick Nguyen in *Proceedings of ASRU 2009*, the entirety of which is incorporated herein by reference.

Given the segmental CRF framework, features that span multiple observations can be defined and used, including expectation features, existence features, and edit distance features, which have been described above. For instance, as described above, existence features can be utilized in connection with the model. A language model state s implies the identity of the last word that was decoded, w(s). Existence features indicate whether a detector unit exists in a word's span. Existence features can be of the following form:

$$f_u(s,s',o_{st}^{et}) = \delta(w(s')=u)\delta(u \in span(st,et)).$$

As indicated above, a dictionary may not be necessary for existence features; however, generalization may not be possible across words. Higher order existence features defined on the existence of ngrams of detector units can also be automatically constructed.

With respect to expectation features, the pronunciation of a word in terms of atomic units can be pron(w). Expectation features represent one of four events: correct accept, false reject, false accept, or correct reject of an ngram of units within a span of a word. The correct accept, the false reject, and the false accept can be in order of the following form:

$$f_u(s,s',o_{st}^{et}) = \delta(u \in pron(w(s')))\delta(u \in span(st,et))$$

$$f_u(s,s',o_{st}^{et}) = \delta(u \in pron(w(s')))\delta(u \notin span(st,et))$$

$$f_u(s,s',o_{st}^{et}) = \delta(u \notin pron w(s'))\delta(u \in span(st,et))$$

Thus, expectation features are indicators of consistency between units expected, given a word (pron(w)) and those that are actually in the observed observation span. There may be one of such features for each unit, and they can be independent of word identity. Thus these features can provide generalization ability. Even if a particular word is not seen in training data or a new word is added to the dictionary, the features are still well defined and the $\lambda_s$ previously learned can be utilized. To measure higher order levels of consistency, bigrams and trigrams of atomic detector units can also be automatically generated.

If a word has multiple pronunciations, the following can occur. A correct accept can be triggered if any pronunciation contains an observed unit sequence. A false accept can be triggered if no pronunciation includes an observed unit sequence. A false reject can be triggered if all pronunciations contain a unit sequence, and such unit sequence is not present in the detector stream.

Context-independent edit distance features can measure consistency between expected and observed detections. To construct such features, the edit distance can be computed between the unit present in a segment and the units in the pronunciations of a word. The following features may then be created:

$f_u^{match}$=number of times u is matched
$f_u^{sub}$=number of times u (in pronunciation) is substituted
$f_u^{del}$=number of times u is deleted
$f_u^{ins}$=number of times u is inserted In the context of context-independent edit distance features, the use of expanded ngram units may not make sense. Like expectation features, context-independent edit distance features provide generalization ability, as they are well defined for words that have not been seen in training. When multiple pronunciations of a given word are present, a smallest edit distance can be utilized for context-dependent edit distance features. Of course other features can be utilized in connection with the aforementioned features in connection with recognizing a word spoken by an individual.

Figure 7:
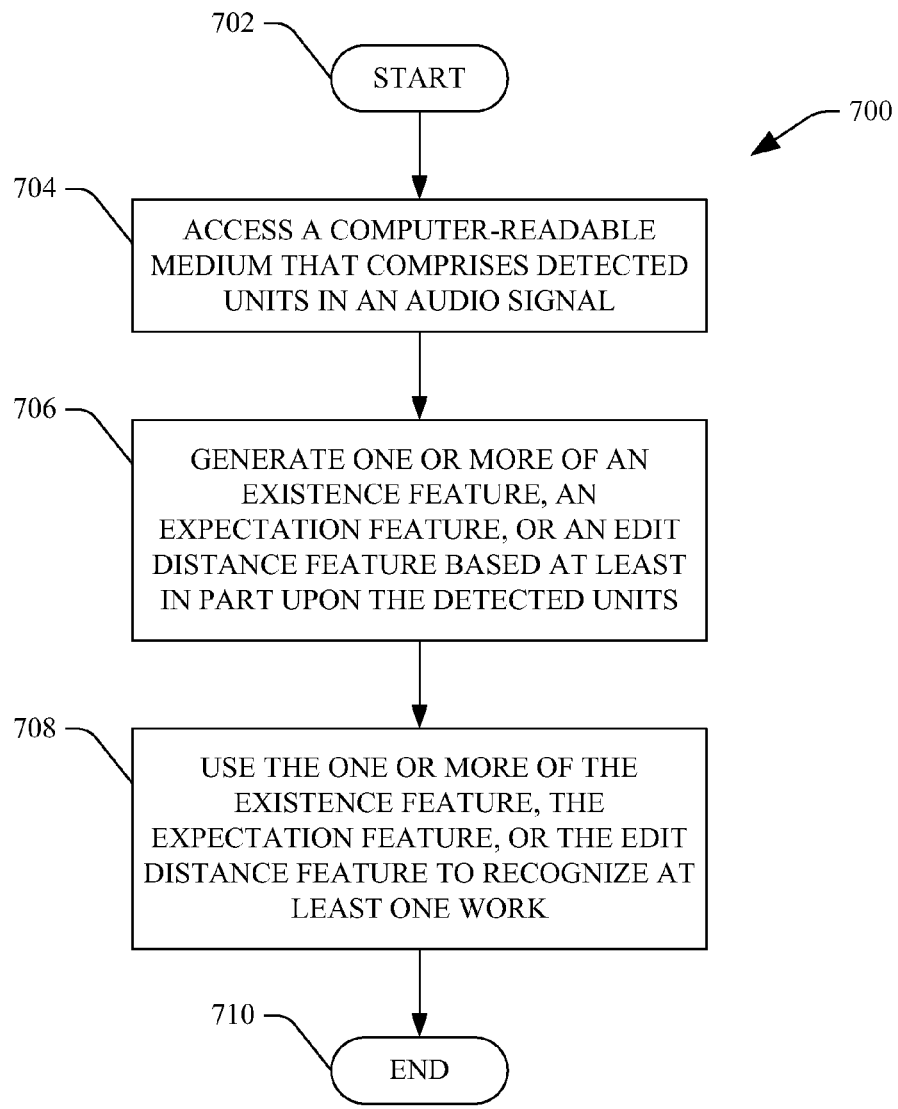
FIG. 7 is a flow diagram that illustrates an example methodology for using at least one feature as an input to a statistical speech recognition model.
Figure 8:
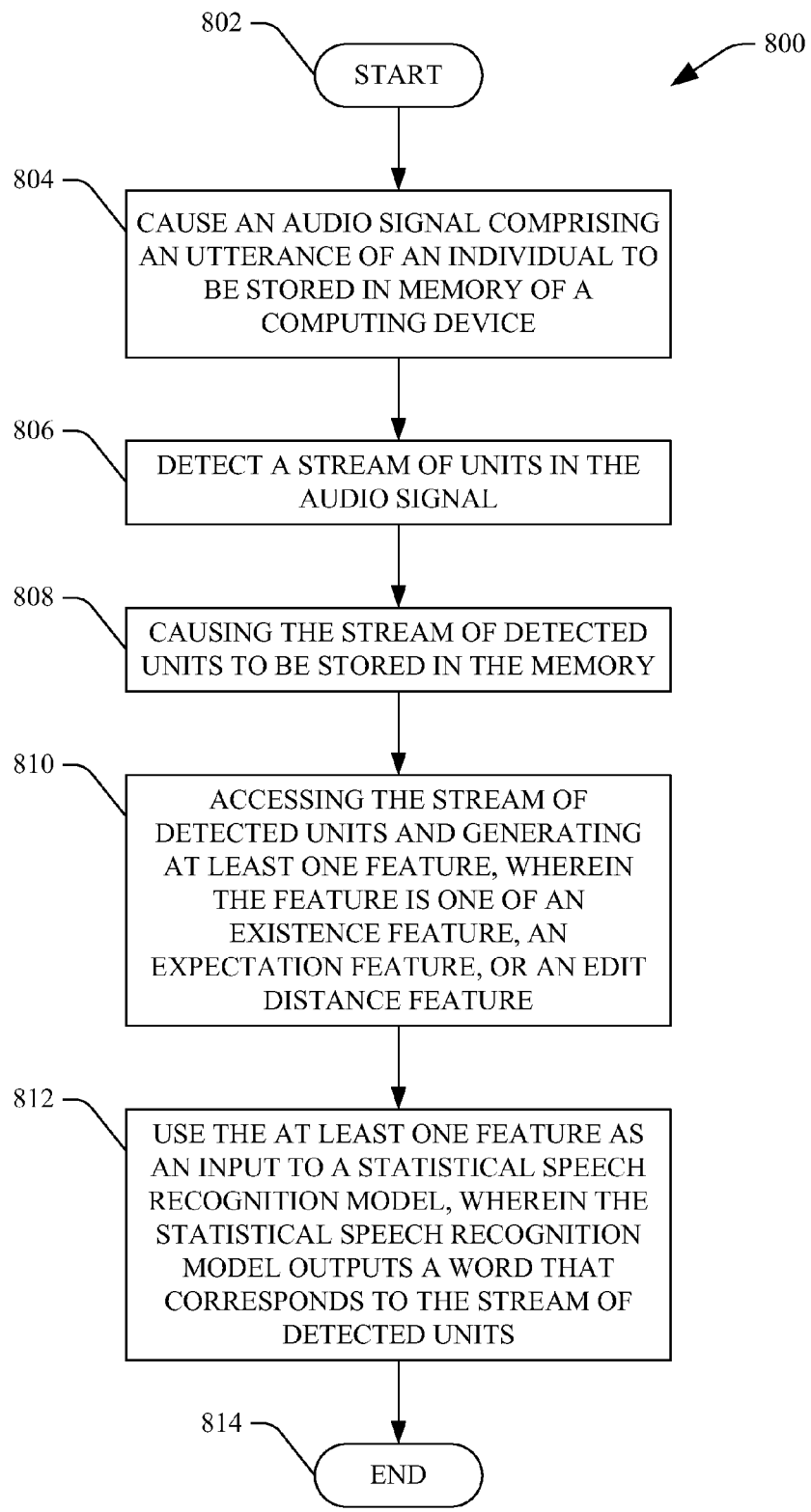
FIG. 8 is an example computing system.

With reference now to FIGS. 7 and 8, various methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 7, a methodology 700 that facilitates using one or more features in connection with recognizing a word in a speech utterance of an individual is illustrated. The methodology 700 begins at 702, and at 704 a computer-readable medium is accessed, wherein the computer-readable medium comprises a plurality of detected units in an audio signal. The audio signal can include an utterance spoken by an individual, wherein the utterance includes a word or sequence of words. The plurality of detected units may be detected by a detector that generates a stream of detected units. A stream of detected units can include a plurality of units and time stamps corresponding thereto.

At 706, one or more of an existence feature, an expectation feature, or an edit distance feature can be generated, based at least in part on the detected units in the audio signal. As described above, an existence feature indicates for a certain hypothesized word whether or not a particular unit is detected in at least one of the plurality of detected units. The expectation feature can indicate whether or not a detected unit is consistent with expected units of a hypothesized word, as ascertained from a dictionary. Further, an edit distance feature can be context-dependent or context-independent, and can be indicative of consistency between units of a hypothesized word and the plurality of units detected.

At 708, one or more of the existence feature, the expectation feature, or the edit distance feature is utilized to recognize at least one word in the utterance spoken by the individual. This word can then be used to identify an intent of the individual, for example. Thus the methodology 700 may be executed in a system that supports directory lookup assistance. In another example, the methodology 700 may be used in a dictation system. Methodology 700 completes at 710.

Turning now to FIG. 8, an example methodology 800 for utilizing one or more features to determine a word in a speech utterance is illustrated. The methodology 800 begins at 802, and at 804 an audio signal that comprises an utterance of an individual is caused to be stored in memory of a computing device. For instance, the computing device may be a mobile telephone.

At 806, a stream of units is detected in the audio signal, wherein the stream of detected units comprises identifications of respective detected units and time stamps corresponding to the respective detected units. For instance, the detected units can be phones or sequences of phones.

At 808, the stream of detected units is caused to be stored in memory of the computing device. At 810, the stream of detected units is accessed, and at least one feature is generated, at least in part upon the stream of detected units. The at least one feature is one of an existence feature, an expectation feature, or an edit distance feature.

At 812, the at least one feature is used as an input to a statistical speech recognition model, such as a segmented CRF model. The statistical speech recognition model outputs a word that corresponds to the stream of detected units, based at least in part upon the at least one feature generated at 810. The methodology 800 completes at 814.

Figure 9:
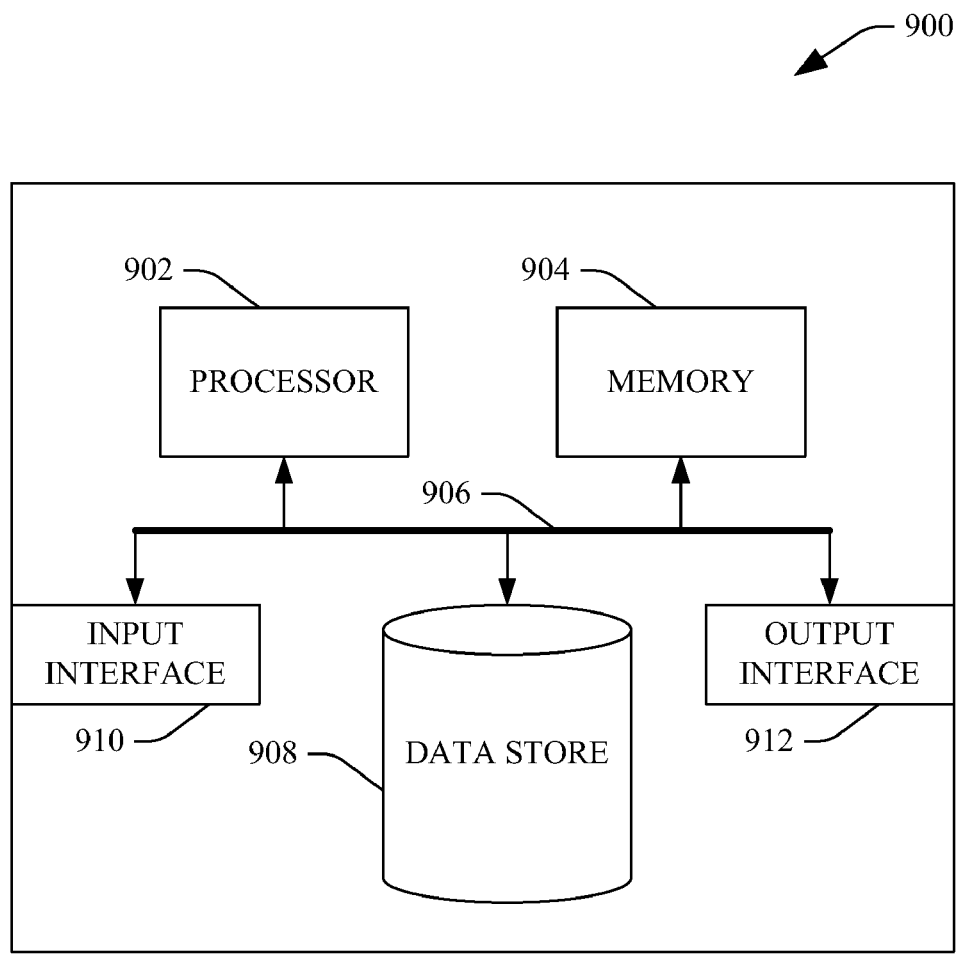

Now referring to FIG. 9, a high-level illustration of an example computing device 900 that can be used in accordance with the systems and methodologies disclosed herein is illustrated. For instance, the computing device 900 may be used in a system that supports speech recognition. In another example, at least a portion of the computing device 900 may be used in a system that supports generation of one or more features pertaining to detected units generating detected unit streams based at least in part upon an audio signal that comprises an utterance of an individual, etc. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store captured speech utterances of an individual, detected unit streams, pronunciations of words from a dictionary, amongst other data.

The computing device 900 additionally includes a data store 908 that is accessible by the processor 902 by way of the system bus 906. The data store 908 may include executable instructions, detected unit streams, one or more features, etc. The computing device 900 also includes an input interface 910 that allows external devices to communicate with the computing device 900. For instance, the input interface 910 may be used to receive instructions from an external computer device, an audio signal from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Furthermore, a system or component may be a portion of memory or a set of transistors. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following acts:
accessing a computer-readable data storage device, wherein the computer-readable data storage device comprises a plurality of detected units from an input sensor, wherein the plurality of detected units are from at least one of an audio signal, a gesture, or computer device input that pertains to an utterance of an individual;

generating one or more of an existence feature, an expectation feature, or an edit distance feature based at least in part upon the plurality of detected units, wherein the edit distance feature is indicative of a consistency between a hypothesized word and a plurality of units in the detected units; and using the one or more of the existence feature, the expectation feature, or the edit distance feature to recognize at least one word in the utterance of the individual, wherein the method is executed by a computer processor.

2. The method of claim 1, wherein the existence feature indicates, for a certain hypothesized word, whether or not a particular unit is detected in at least one of the plurality of detected units.

3. The method of claim 2, wherein the particular unit is one of a phone, a sequence of phones, or a syllable.

4. The method of claim 1, wherein the expectation feature indicates whether or not a detected unit is consistent with expected units of a hypothesized word as ascertained from a dictionary.

5. The method of claim 4, wherein the detected unit and the expected units are phones, sequences of phones, or syllables.

6. The method of claim 4, wherein the expectation feature is at least one of:
an indication that a detected unit in the plurality of detected units is expected to be detected for the hypothesized word;
an indication that a detected unit in the plurality of detected units is not expected to be detected for the hypothesized word;
an indication that a unit in the hypothesized word is not included in the plurality of detected units; or
an indication that a unit not existent in the hypothesized word is not included in the plurality of detected units.

7. The method of claim 1 configured for execution on a mobile computing device.

8. The method of claim 1, wherein the edit distance feature is indicative of a number of edits that are to be performed on the detected units to cause the detected units to be consistent with units in the hypothesized word.

9. The method of claim 8, wherein the edit distance feature is indicative of at least one of the following:
that a unit in the hypothesized word matches a unit in the detected stream of units;
that a unit has been added to the units in the hypothesized word to cause the plurality of detected units to be consistent with units of the hypothesized word;
that a unit has been removed from the units in the hypothesized word to cause the plurality of detected units to be consistent with units of the hypothesized word; or
that a unit in the units of the hypothesized word has been replaced by another unit to cause the plurality of detected units to be consistent with units of the hypothesized word.

10. The method of claim 1, wherein using the one or more of the existence feature, the expectation feature, or the edit distance feature to recognize at least one word in the utterance spoken by the individual comprises utilizing the one or more of the existence feature, the expectation feature, or the edit distance feature as an input to a statistical speech recognition model.

11. The method of claim 10, wherein the statistical speech recognition model is a direct speech recognition model.

12. The method of claim 11, wherein the direct speech recognition model is a segmental conditional random fields model.

13. The method of claim 1, further comprising:
receiving the audio signal; and
executing a detector to generate the plurality of detected units, wherein the detected units are one of phones or sequences of phones.

14. A computer-readable data storage device comprising instructions that, when executed by a processor, cause the processor to perform acts comprising:
causing an audio signal comprising an utterance of an individual to be stored in memory of a computing device;
generating a stream of detected units in the audio signal, wherein the stream of detected units comprises identifications of respective detected units, timestamps corresponding to the respective detected units, and a probability corresponding to the detected units;
causing the stream of detected units to be stored in the memory of the computing device;
accessing the stream of detected units and generating at least one feature, wherein the at least one feature is one of an existence feature, an expectation feature, or an edit distance feature, wherein the existence feature is indicative of whether a unit in the stream of detected units exists, wherein the expectation feature is indicative of whether a unit in a hypothesized word is included in the stream of detected units, and wherein the edit distance feature is indicative of consistency between a plurality of detected units and the hypothesized word; and
using the at least one feature as an input to a statistical speech recognition model, wherein the statistical speech recognition model outputs a word that corresponds to the stream of detected units based at least in part upon the at least one feature.

15. A computer-implemented speech recognition system comprising:
a processor; and
a memory that comprises a plurality of components that are executed by the processor, the plurality of components comprising
a receiver component that receives a plurality of detected units of an audio signal, wherein the audio signal comprises a speech utterance of an individual;
a search component that executes a search over training data, wherein the search component comprises:
a selector component that selects a subset of the plurality of detected units that correspond to a particular time-span; and
a generator component that generates at least one feature with respect to the particular time-span, wherein the at least one feature is one of an existence feature, an expectation feature, or an edit distance feature, and wherein the edit distance feature is indicative of a number of edits that are to be performed on the detected units to cause the detected units to be consistent with units in the hypothesized word; and
a statistical speech recognition model that outputs at least one word that corresponds to the particular time-span based at least in part upon the at least one feature generated by the feature generator component.

16. The system of claim 15, further comprising a weight assignor component that assigns a weight to the at least one feature, wherein statistical speech recognition model utilizes the weight in connection with outputting the at least one word.

17. The system of claim 15, wherein the edit distance feature is a context-dependent edit distance feature.

18. The system of claims 15, wherein a confidence score is assigned to at least one unit in the plurality of detected units.

19. The system of claim 15, wherein the plurality of detected units are phones, phone classes, sequences of phones, syllables, words, or a combination thereof.

20. The system of claim 15, wherein the edit distance feature is indicative of a consistency between a hypothesized word and a plurality of units in the detected units.

* * * * *